(12) United States Patent
Jones et al.

(10) Patent No.: US 12,690,526 B2
(45) Date of Patent: Jul. 28, 2026

(54) GATE LATCH POCKET DEFLECTOR

(71) Applicant: DEERE & COMPANY, Moline, IL (US)

(72) Inventors: Austin J. Jones, Ottumwa, IA (US); William P. Schinstock, Ottumwa, IA (US)

(73) Assignee: Deere & Company, Moline, IL (US)

( * ) Notice: Subject to any disclaimer, the term of this patent is extended or adjusted under 35 U.S.C. 154(b) by 575 days.

(21) Appl. No.: 18/311,812

(22) Filed: May 3, 2023

(65) Prior Publication Data

US 2024/0365714 A1 Nov. 7, 2024

(51) Int. Cl.
*A01F 15/08* (2006.01)
*A01F 15/07* (2006.01)

(52) U.S. Cl.
CPC .......... *A01F 15/0875* (2013.01); *A01F 15/07* (2013.01); *A01F 15/08* (2013.01); *A01F 15/0883* (2013.01); *A01F 2015/0785* (2013.01)

(58) Field of Classification Search
CPC ...... A01F 15/0875; A01F 15/07; A01F 15/08; A01F 15/0883; A01F 2015/0785
See application file for complete search history.

(56) References Cited

U.S. PATENT DOCUMENTS

| | | | |
|---|---|---|---|
| 4,389,930 A | | 6/1983 | Rutschilling |
| 4,407,190 A | * | 10/1983 | Cheatum ............. A01F 15/0883 100/88 |
| 5,598,690 A | | 2/1997 | Mcclure et al. |
| 7,191,699 B1 | * | 3/2007 | Anstey ................... A01F 15/08 100/88 |

| | | | |
|---|---|---|---|
| 2005/0081502 A1 | * | 4/2005 | Fox .......................... A01F 15/07 56/341 |
| 2014/0261022 A1 | * | 9/2014 | Smith ................. A01F 15/0883 100/87 |
| 2016/0316633 A1 | * | 11/2016 | Smith ................. A01F 15/0875 |

FOREIGN PATENT DOCUMENTS

EP 3942921 A1 1/2022

OTHER PUBLICATIONS

CN 111802089 A, Liu, Ying (Year: 2020).*
Extended European Search Report and Written Opinion issued in European Patent Application No. 24172593.6 dated Nov. 5, 2024, in 11 pages.
Images of Brush Grommet Square, retrieved from the Internet. Search result before filing.

* cited by examiner

*Primary Examiner* — Nicole Coy
*Assistant Examiner* — Jennifer A Railey
(74) *Attorney, Agent, or Firm* — Hanley, Flight and Zimmerman, LLC

(57) ABSTRACT

A baler implement may include a main frame, a main housing, a gate, a latch housing, a latch, and a debris shield. The main housing is supported by the main frame. The gate is attached to and rotatably supported by the main housing. The latch housing is coupled to one of the main frame and the gate. The latch housing has a retainer and defines a pocket. The latch is coupled to an other of the main frame and the gate. The latch is controllable between a release position operable to disengage the retainer to allow the gate to move relative to the main housing and an engaged position operable to engage the retainer to hold the gate relative to the main housing. The debris shield is resiliently deformable to allow the latch to move through the opening of the pocket to limit debris entering the pocket.

16 Claims, 13 Drawing Sheets

GATE LATCH POCKET DEFLECTOR

CROSS-REFERENCE TO RELATED APPLICATIONS

N/A.

TECHNICAL FIELD

The present disclosure relates generally to a baler implement, especially a round baler having a gate to release a bale.

BACKGROUND

Some balers, including round balers, roll the crop material in a spiral fashion into a bale in a baling chamber. The balers may have a main housing and a gate to form the bailing chamber and the gate may pivot relative to the main housing to release the bale.

SUMMARY

According to an aspect of the present disclosure, a baler implement may include a main frame, a main housing, a gate, a latch housing, a latch, and a debris shield. The main frame extends along a central longitudinal axis between a forward end and a rearward end relative to a direction of travel. The main housing is attached to and supported by the main frame. The gate is positioned adjacent the rearward end of the main frame and attached to and rotatably supported by the main housing. The gate is pivotably moveable about a gate axis that is perpendicular to the central longitudinal axis of the main frame. The latch housing is coupled to one of the main frame and the gate. The latch housing has a retainer and defines a pocket having an opening. The latch is coupled to an other of the main frame and the gate for engaging the retainer of the latch housing. The latch is controllable between a release position operable to disengage the retainer to allow the gate to move relative to the main housing and an engaged position operable to engage the retainer to hold the gate relative to the main housing. The debris shield is positioned to at least partially cover the opening. The debris shield is resiliently deformable to allow the latch to move through the opening of the pocket to limit debris entering the pocket.

According to an aspect of the present disclosure, a latch assembly coupled to a main frame of a baler implement to selectively hold a gate relative to a main housing of the baler implement is introduced. The latch assembly may include a latch housing, a latch, and a debris shield. The latch housing is coupled to one of the main frame and the gate. The latch housing has a retainer and defines a pocket having an opening. The latch is coupled to an other of the main frame and the gate for engaging the retainer of the latch housing. The latch is controllable between a release position operable to disengage the retainer to allow the gate to move relative to the main housing and an engaged position operable to engage the retainer to hold the gate relative to the main housing. The debris shield is positioned to at least partially cover the opening. The debris shield is resiliently deformable to allow the latch to move through the opening of the pocket to limit debris entering the pocket.

According to an aspect of the present disclosure, a baler implement may include a main frame, a main housing, a gate, a latch housing, a latch, and a debris shield. The main frame extends along a central longitudinal axis between a forward end and a rearward end relative to a direction of travel. The main housing is attached to and supported by the main frame. The gate is positioned adjacent the rearward end of the main frame and attached to and rotatably supported by the main housing. The gate is pivotably moveable about a gate axis that is perpendicular to the central longitudinal axis of the main frame. The latch housing is coupled to one of the main house and the gate. The latch housing has a retainer and defines a pocket having an opening. The latch is coupled to an other of the main house and the gate for engaging the retainer of the latch housing. The latch is controllable between a release position operable to disengage the retainer to allow the gate to move relative to the main housing and an engaged position operable to engage the retainer to hold the gate relative to the main housing. The debris shield is positioned to at least partially cover the opening. The debris shield is resiliently deformable to allow the latch to move through the opening of the pocket to limit debris entering the pocket.

Other features and aspects will become apparent by consideration of the detailed description, claims, and accompanying drawings.

BRIEF DESCRIPTION OF THE DRAWINGS

The detailed description of the drawings refers to the accompanying figures.

3

Figure 8A:
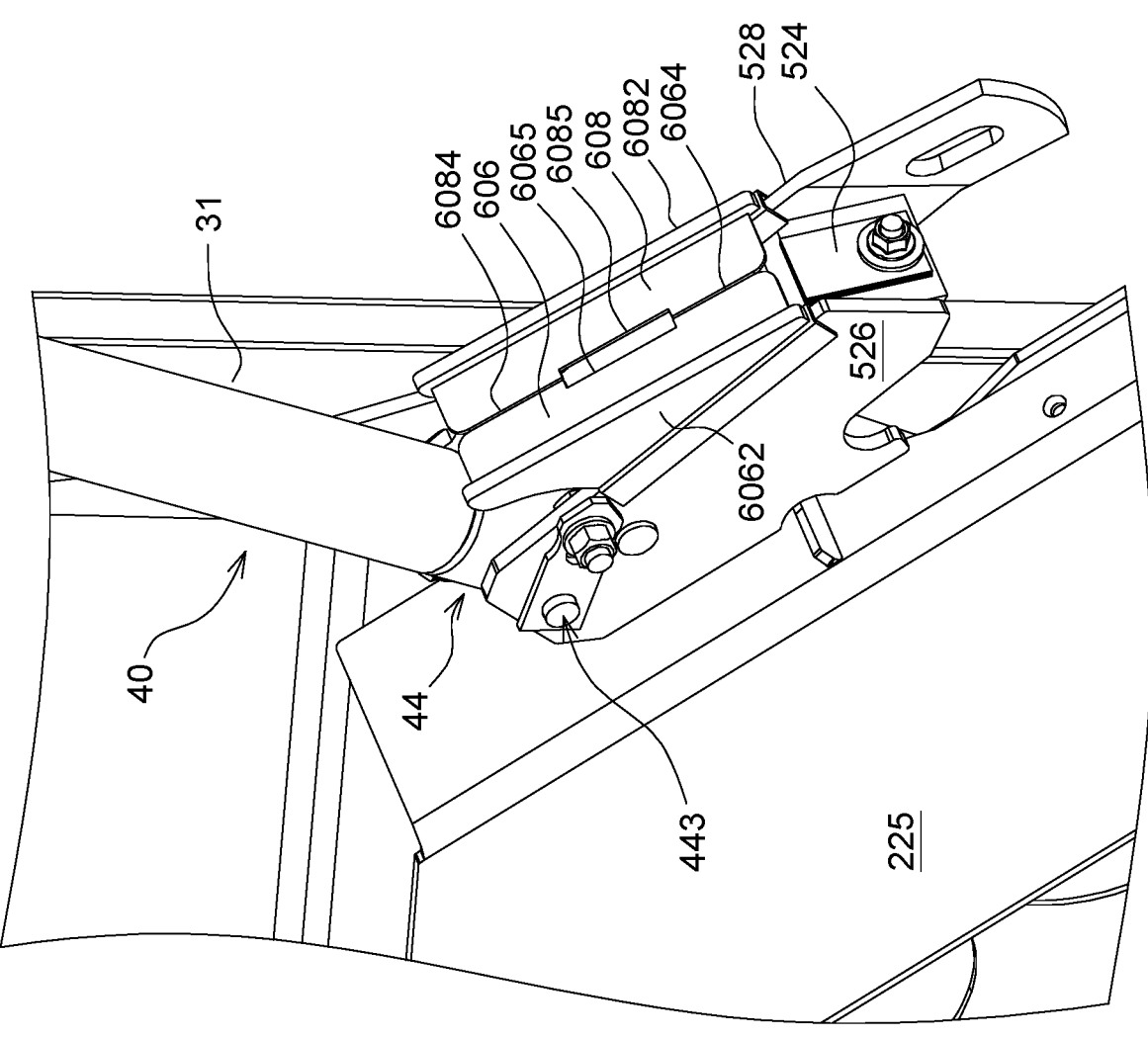
FIG. 8A illustrates an implementation of the debris shield having a first flexible flap and a second flexible flap cooperatively and at least partially covering the opening of the pocket of the latch housing.
Figure 8B:
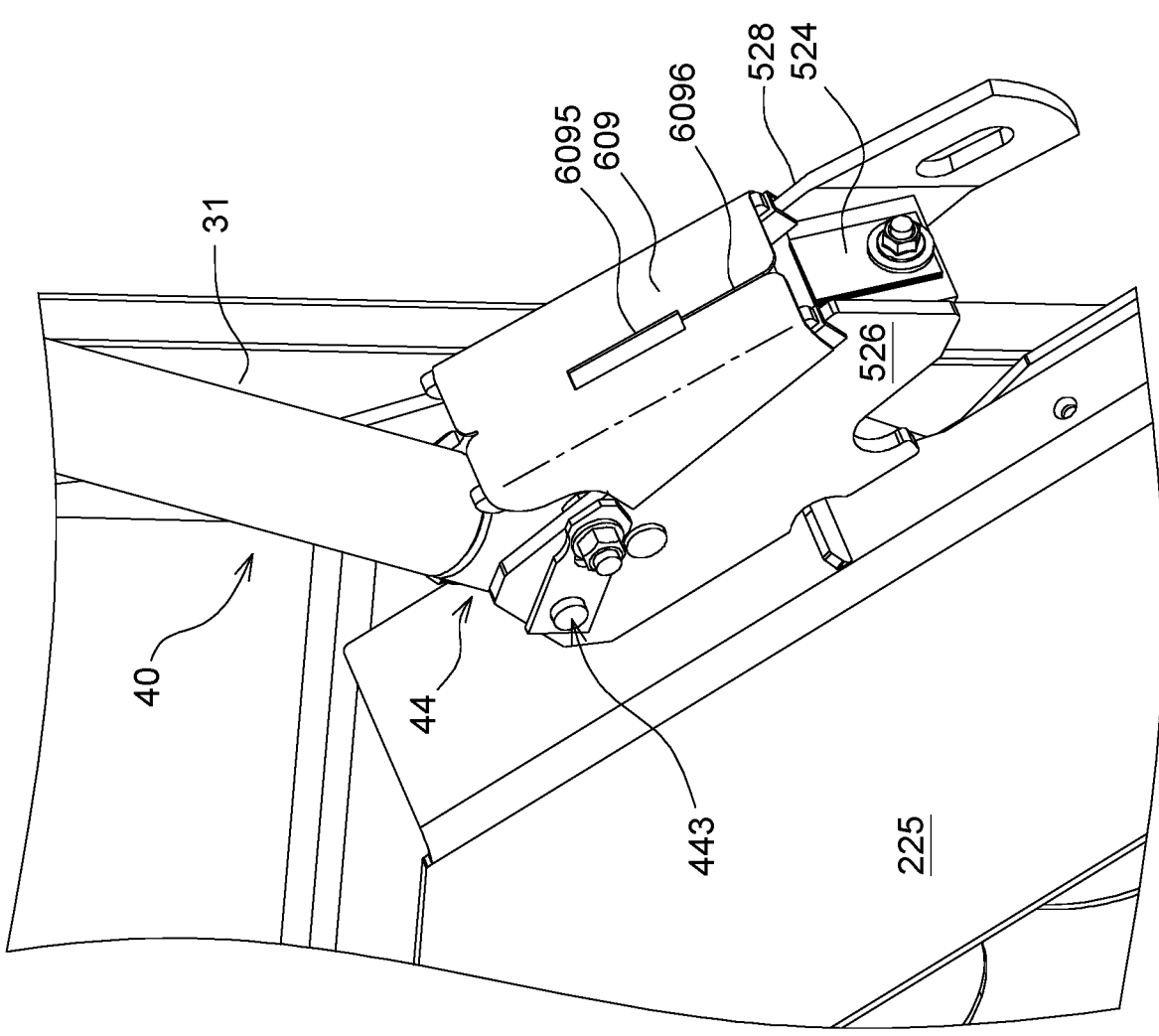

FIG. 8B illustrates an implementation of the debris shield having a single flexible flap at least partially covering the opening of the pocket of the latch housing.

Figure 9:
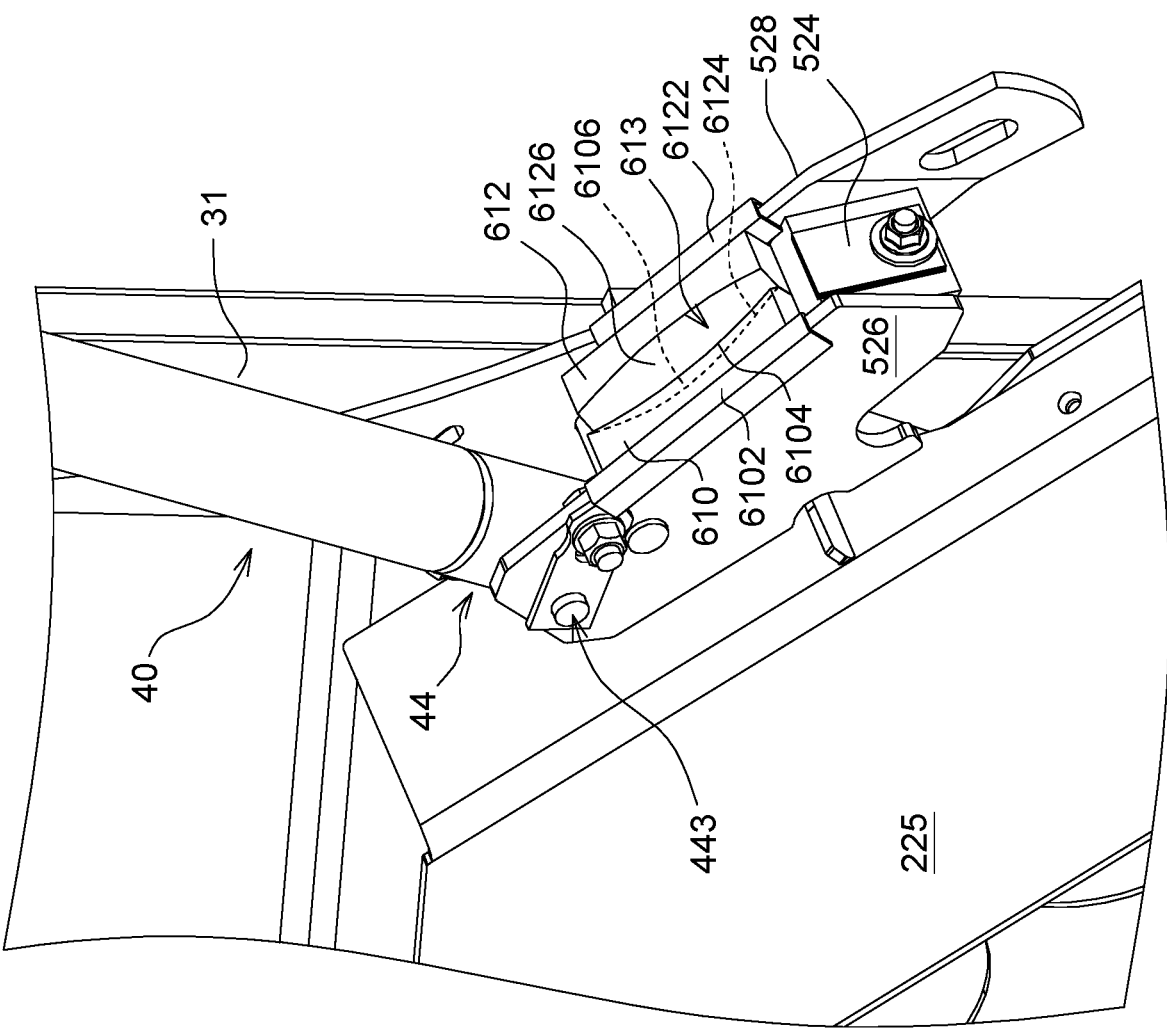

FIG. 9 illustrates an implementation of the debris shield having a first foam block and a second foam block cooperatively and at least partially covering the opening of the pocket of the latch housing.

Like reference numerals are used to indicate like elements throughout the several figures.

DETAILED DESCRIPTION

For some bales, such as a round baler, a gate should be securely closed during bale formation to ensure baling performance and avoid crop material leaving a baling chamber defined by a main housing and the gate. A latch may be equipped to hold the gate closed during bale formation. The latch can unlock the gate to release the bale. The latch is moveable in a pocket formed by a latch housing. However, during the repetitive motion of the gate opening and closing or other situation, debris, such as crop material, may build up in the pocket, thereby affecting the operation of the latch. The gate therefore may not be securely closed.

Figure 1:
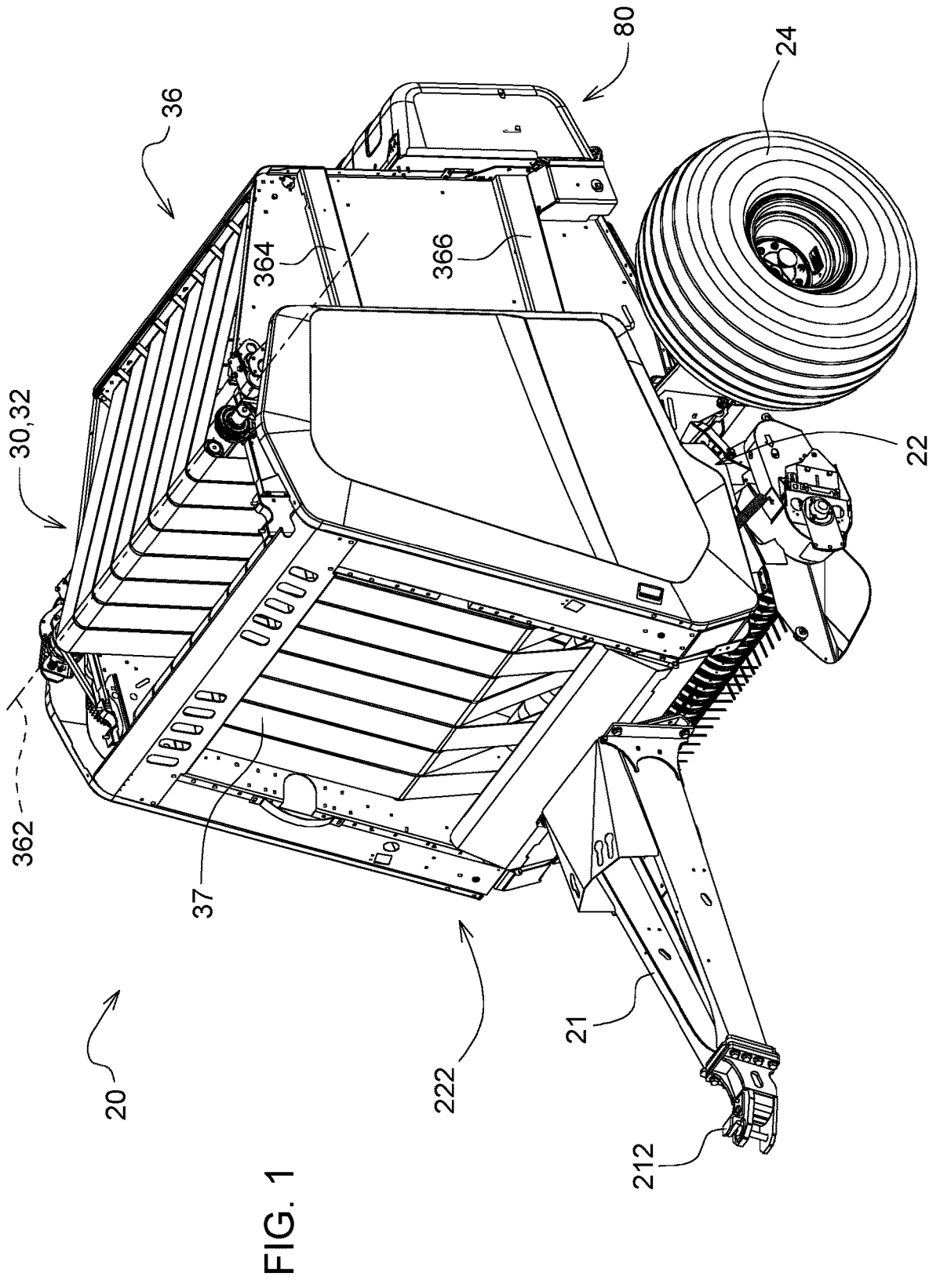
FIG. 1 is a schematic perspective view of a baler implement.
Figure 2:
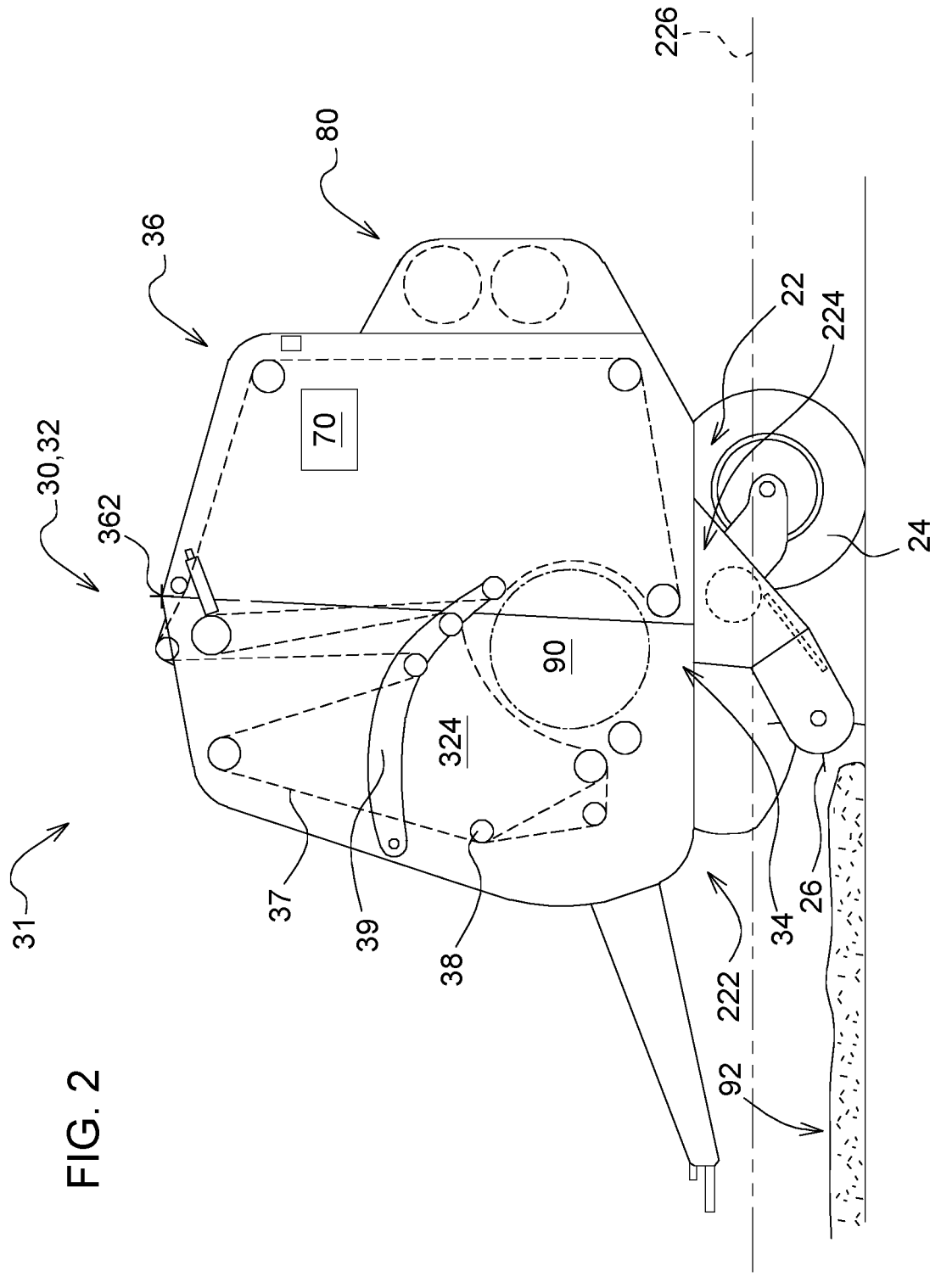
FIG. 2 is a schematic side view of the baler implement of FIG. 1.

Referring to FIGS. 1 and 2, a baler implement 20 is generally shown. The baler implement 20 in this implementation is a round baler with a variable baling chamber; in another implementation, the baler implement 20 can be a round baler with a fixed baling chamber. The baler implement 20 includes a main frame 22. The main frame 22 extends along a central longitudinal axis 226 between a forward end 222 and a rearward end 224 relative to a direction of travel. One or more ground engaging elements 24, such as but not limited to one or more wheels and/or tracks, are attached to and rotatably supported by the main frame 22. A tongue 21 may be coupled to the main frame 22 at the forward end 222 of the main frame 22. A hitch arrangement 212 may be included with the tongue 21. The hitch arrangement 212 may be used to attach the baler implement 20 to a traction unit (not shown), such as but not limited to an agricultural tractor. In other embodiments, the baler implement 20 may be self-propelled, in which case the traction unit and the baler implement 20 are configured as a single, self-propelled vehicle.

The baler implement 20 includes a pick-up 26 disposed proximate the forward end 222 of the main frame 22. The pick-up 26 gathers crop material from a ground surface and directs the gathered crop material toward and into an inlet 34 of the baling chamber 32. The pick-up 26 moves crop material along a crop path 92 relative to the main frame 22. The pick-up 26 may include, but is not limited to tines, forks, augers, conveyors, baffles, etc., for gathering and moving the crop material.

The baler implement 20 includes a baling system 30 having a main housing 31 forming a baling chamber 32. The main housing 31 is attached to and supported by the main frame 22. The main housing 31 may include one or more walls or panels that at least partially enclose and/or define the baling chamber 32. The baler implement 20 further includes a gate 36, which may define the baling chamber 32 with the main housing 31. The gate 36 is attached to and rotatably supported by the main housing 31. The gate 36 is positioned adjacent the rearward end 224 of the main frame 22 and is pivotably moveable about a gate axis 362. The gate axis 362 is generally horizontal and perpendicular to the central longitudinal axis 226 of the main frame 22. The gate 36 is moveable between a closed position for forming a bale 90 within the baling chamber 32, and an open position for

Figure 3:
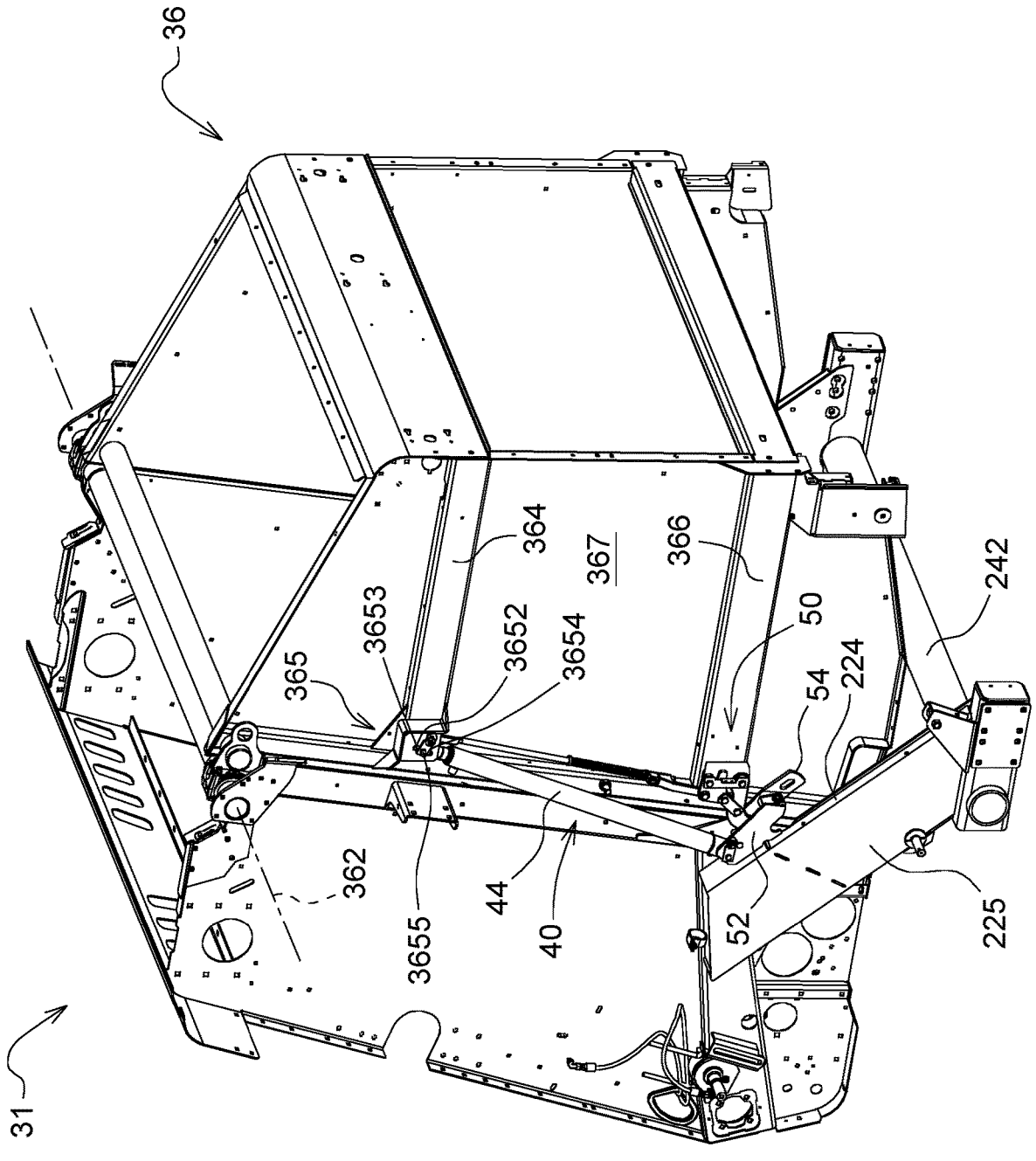
FIG. 3 is perspective view of a main housing with an exterior panel omitted and a gate of the baler implement; the gate is at a closed position.
Figure 4:
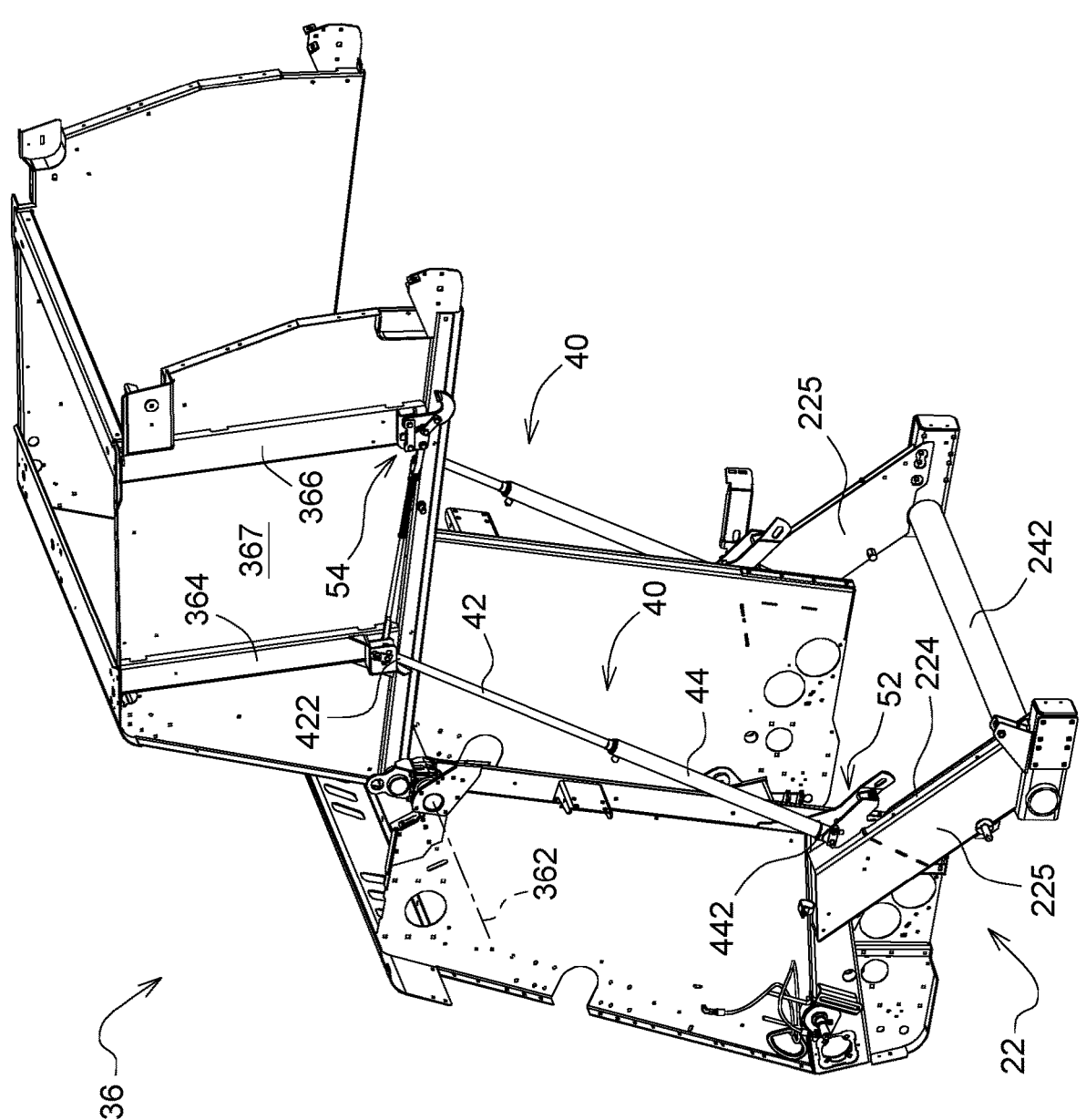
FIG. 4 is perspective view of the main housing with the exterior panel omitted and the gate of the baler implement; the gate is at an open position.

4 discharging the bale 90 from the baling chamber 32. As shown in FIGS. 3 and 4, one side of the gate 36 is shown. The gate 36 may have a first beam 364 and a second beam 366 amounted on a side panel 367 of the gate 36. The second beam 366 is positioned below the first beam 364. Other elements, such as actuators 40, may be coupled to the first beam 364 so as to pivot the gate 36. The baler implement 20 may also include a latch assembly 50 controllable between a release position to release the gate 36 and an engaged position to lock the gate 36. The movement of the gate 36 is described in greater detail below.

The baler implement 20 may be configured as a variable chamber baler, or as a fixed chamber baler. The baler implement 20 shown in the FIGS. 1 and 2 and described herein is depicted and described as a variable chamber baler. As is understood by those skilled in the art, the variable chamber baler includes a plurality of longitudinally extending side-by-side forming belts 37 that are supported by a plurality of rollers 38. The bale 90 is formed by the forming belts 37 and one or more side walls of the main housing 31.

The crop material is directed through the inlet 34 and into the baling chamber 32, whereby the forming belts 37 roll the crop material in a spiral fashion into the bale 90 having a cylindrical shape. The forming belts 37 apply a constant pressure to the crop material as the crop material is formed into the bale 90. A belt tensioner 39 continuously moves the forming belts 37 radially outward relative to a center of the cylindrical bale 90 as the diameter of the bale 90 increases. The belt tensioner 39 maintains the appropriate tension in the forming belts 37 to obtain the desired density of the crop material.

The baler implement 20 includes a wrap system 80. The wrap system 80 is operable to wrap the bale 90 with a wrap material inside the baling chamber 32. Once the bale 90 is formed to a desired size, the wrap system 80 feeds the wrap material into the baling chamber 32 to wrap the bale 90 and thereby secure the crop material in a tight package and maintain the desired shape of the bale 90. The wrap material may include, but is not limited to, a twine, a net mesh, or a solid plastic wrap. Movement of the gate 36 into the open position simultaneously moves the belts clear of the formed bale 90 and allows the formed and wrapped bale to be discharged through the rear of the baling chamber 32.

With reference to FIGS. 3 and 4, the baler implement 20 may include the two actuators 40 coupled to the gate 36 and operable to pivot the gate 36 upward to open the gate 36 and to pivot the gate downward to close the gate 36. The actuator 40 in the present disclosure may be a hydraulic cylinder to pivot the gate 36. In another implementation, the actuator 40 may be an electric linear actuator or other types of actuators. The actuator 40 may include a rod 42 and a cap 44. The rod 42 extends relative to the cap 44 to open the gate 36 (as shown in FIG. 4) and retracts relative to the cap 44 to close the gate 36 (as shown in FIG. 3). The rod 42 has a rod end 422 coupled to the first beam 364 via a connector 365 mounted on the first beam 364 or the side panel 367. In the implementation shown in FIGS. 3 and 4, the cap end 442 coupled to the main frame 22 via the latch assembly 50 that is mounted on the main frame 22. In another implementation, the cap end 442 of the actuator 40 may be coupled to another portion of the main frame 22 to support the weight of the gate 36 when the actuator 40 extends to pivot the gate 36.

The latch assembly 50 may include a latch housing 52 and a latch 54 selectively engages the latch housing 52. The latch housing 52 may be coupled to one of the main frame 22 and the gate 36; the latch 54 may be coupled to the other one of the main frame 22 and the gate 36. In the implementation shown in FIGS. 3 and 4, the latch housing 52 is mounted on the main frame 22 and the latch 54 is coupled to the gate 36. In another implementation, the latch housing 52 may be coupled to the gate 36 and the latch 54 may be coupled to the main frame 22 (not shown). Alternatively, the latch housing 52 may be coupled to one of the main housing 31 and the gate 36; the latch may be coupled to the other one of the main housing 31 and the gate 36 (not shown).

Figure 5:
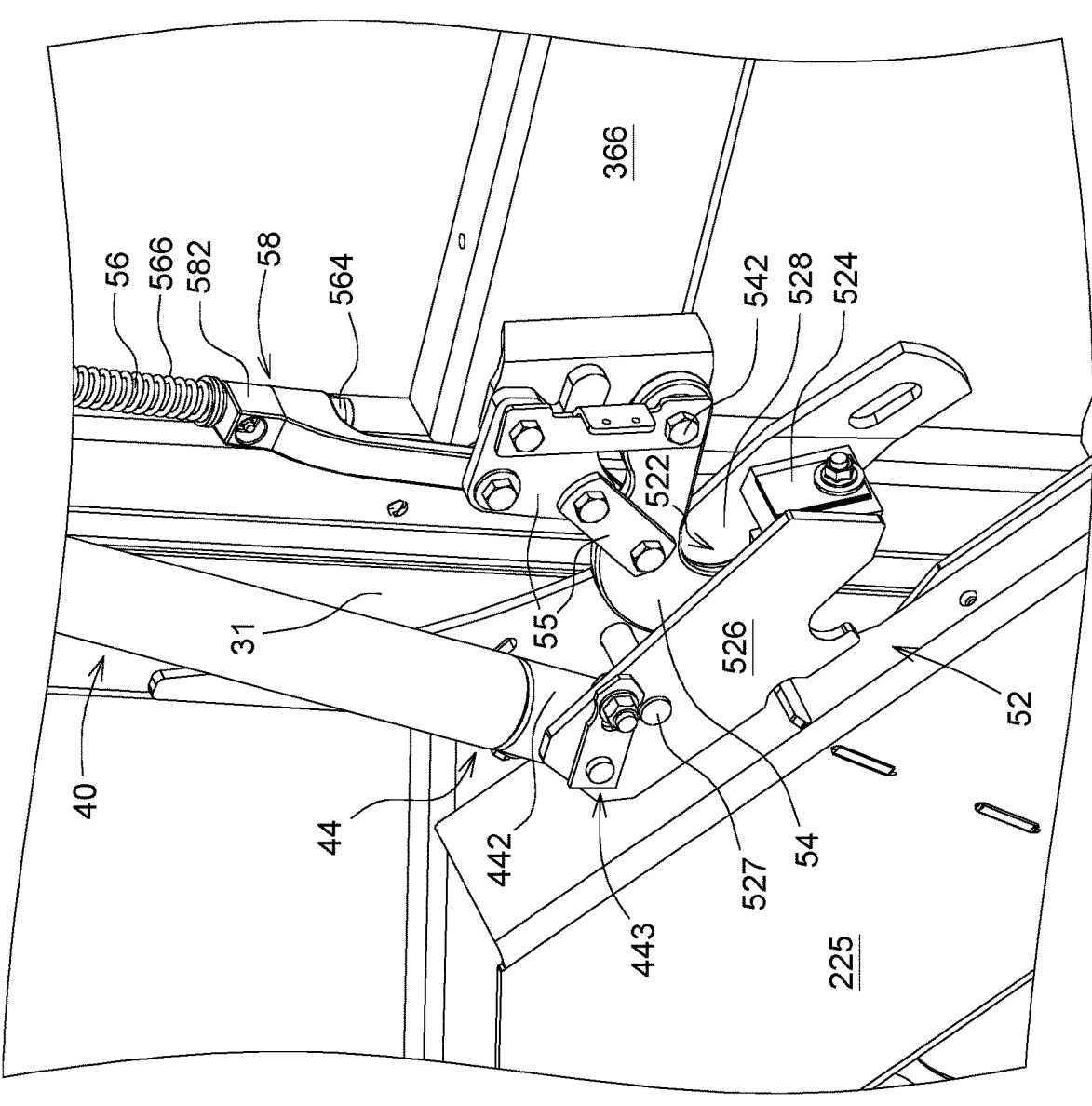
FIG. 5 is an enlarged perspective view of a latch assembly of the baler implement with a debris shield omitted for clarity.

Referring to FIG. 5, a debris shield 60 (shown in FIGS. 7A-9) of the latch assembly 50 is omitted for showing the structure of the latch housing 52. The latch housing 52 may define a pocket 522 having opening. The latch housing 52 may have a retainer 524, a first portion 526, and a second portion 528. In this implementation, the first portion 526 and the second portion 528 are plates (first plate and second plate) parallel to each other, and the retainer 524 is positioned between the first portion 526 and the second portion 528. The retainer 524 may be a block, coupled between the first portion 526 and the second portion 528 through welding, fasteners, or other means. The latch housing 52 may also include a pin 527 or other type of structure that is coupled between the first portion 526 and the second portion 528. The retainer 524 and the pin 527 connect the first portion 526 and the second portion 528 and enhance the strength of the structure of the latch housing 52. The main frame 22 may include a support beam 225 coupled between the main housing 31 and an axle 242 (shown in FIG. 3) of the ground engaging elements 24. The lower edge of the first portion 526 of the latch housing 52 may be coupled to the top surface of the support beam 225 via welding or other means. The second portion 528 of the latch housing 52 may be coupled to the main housing 31 or the support beam 225. The actuator 40 includes a lower end (i.e., the cap end 442) positioned between and supported by the first portion 526 and second portion 528 of the latch housing 52. A fastener 443 is positioned through the first portion 526, the cap end 442 of the actuator 40, and the second portion 528.

The latch 54 is pivotably coupled to the second beam 366 of the gate 36, around a pivot point 542, for engaging the retainer 524 of the latch housing 52. The latch 54 is controllable between a release position (FIG. 6B) operable to disengage the retainer 524 to allow the gate 36 to move relative to the main housing 31 and an engaged position (FIG. 6A) operable to engage the retainer 524 to hold the gate 36 relative to the main housing 31. The latch 54 may be a hook shape with a flat surface contacting a tilted surface of the retainer 524. The pivotal movement of the latch 54 may be driven by the actuator 40 which also pivots the gate 36 as shown in FIGS. 3, 4, 6A, 6B, or driven by another individual actuator (not shown) unrelated to pivoting the gate 36.

In the implementation shown in FIGS. 3, 4, 6A, 6B, the latch assembly 50 may include a linkage 55 coupled to the latch 54 and a latch rod 56, a lower end of which is coupled to the linkage 55 to pivot the latch 54. In another implementation, the lower end (i.e., a second end) of the latch rod 56 may directly be coupled to the latch 54 for pivoting. The connector 365 mounted on the first beam 364 or the side panel 367 (not shown) has a slot 3652 with an upper end 3653 and a lower end 3654. The rod end 422 of the actuator 40 is coupled to a pin 3655, which is slidable between the upper end 3653 and the lower end 3654 of the slot 3652. An upper end (i.e., a first end) of latch rod 56 is coupled to the rod end 422 of the actuator 40 via the pin 3655 in the connector 365. When the actuator 40 extends, the pin 3655, moved by the rod end 422 of actuator 40, slides from the lower end 3654 to the upper end 3653 of the slot 3652.

Figures 6A, 6B:
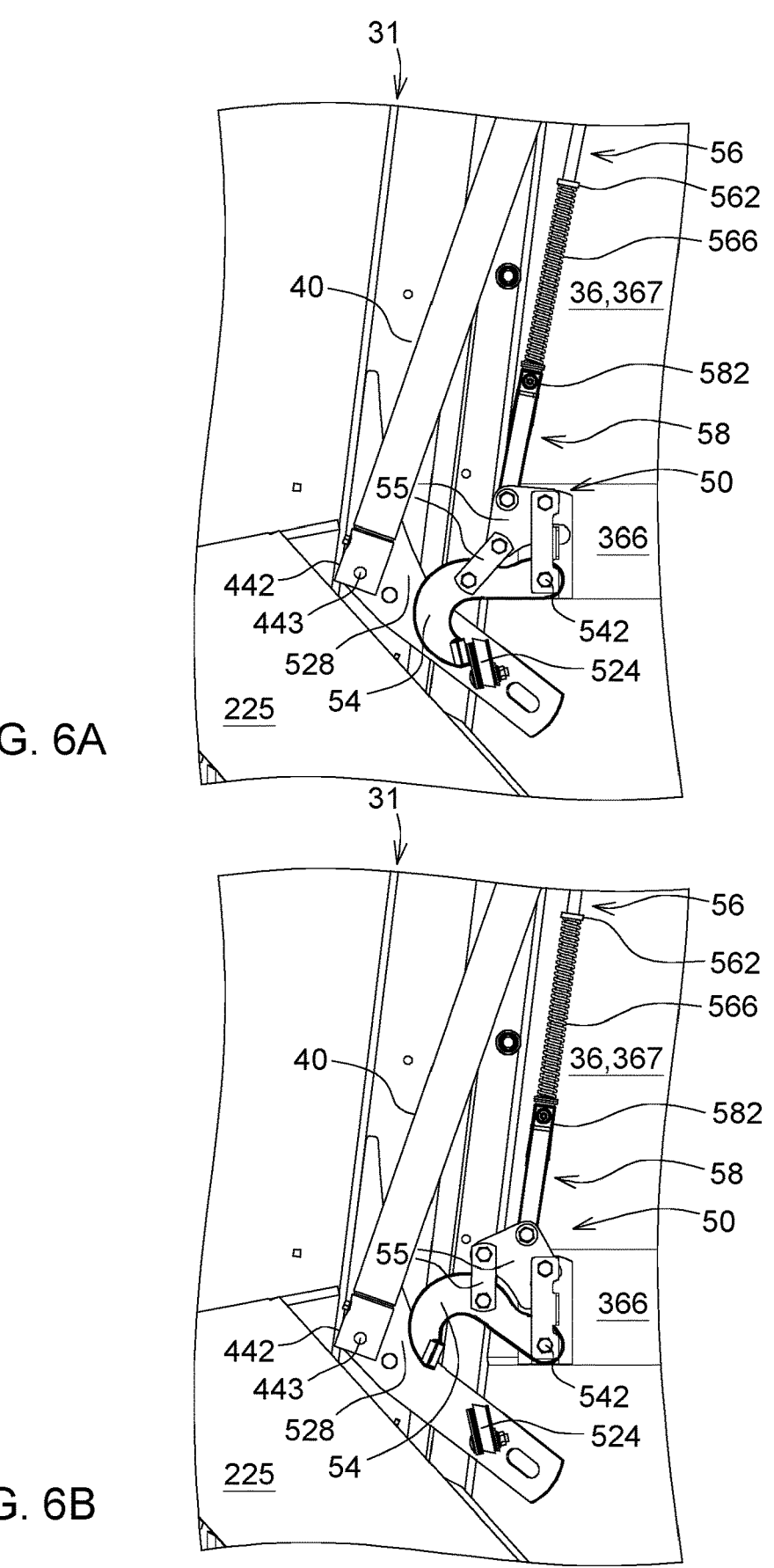
FIG. 6A is a side view of the latch assembly of the baler implement showing an engaged position of a latch with the debris shield and a first portion of a latch housing omitted for clarity.
FIG. 6B is a side view of the latch assembly of the baler implement showing a release position of the latch with the debris shield and the first portion of the latch housing omitted for clarity.

During the movement of the pin 3655 within the slot 3652, the latch rod 56 is lifted upward to pivot the latch 54 clockwise, and the latch 54 pivots from the engaged position (FIG. 6A) to the release position (FIG. 6B). Meanwhile, the gate 36 remains at the closed position. After the pin 3655 contacts the upper end 3653 of the slot 3652 and the actuator 40 continues to extend, the gate 36 starts to open until the open position to release the bale 90. When the actuator 40 retracts, the gate 36 pivots from the open position to the closed position, with the pin 3655 remains at the upper end 3653 of the slot 3652 until the gate 36 is closed at the closed position. Then the actuator 40 continues to retract, and the pin 3655 starts to slide from the upper end 3653 to the lower end 3654. The latch rod 56 is pushed downward to pivot the latch 54 counterclockwise. The latch 54 pivots from the release position (FIG. 6B) to the engaged position (FIG. 6A) to hold the gate 36 closed.

Optionally, referring to FIGS. 5, 6A, 6B, the latch rod 56 may further include a sliding arm 58 slidably position at or near the lower end of the latch rod 56. The latch rod 56 may include an upper stop 562, lower stop 564, and a spring 566. The lower end of the spring 566 abuts the base 582 (top) of the sliding arm 58. The spring 566 and the base 582 of the sliding arm 58 are positioned between the upper stop 562 and the lower stop 564. The sliding arm 58 extends downward from the base 582, passes over the lower stop 564, and is connected to the linkage 55. During the transition from the engaged position to the released position of the latch 54, the actuator 40 extends and the lower stop 564, which is a nut in this implementation, pulls up the base 582 of the sliding arm 58 without substantially changing the length of the spring 566. The sliding arm 58 pulls the linkage 55 to unlock the latch 54. During the transition from the released position to the engaged position of the latch 54, the actuator 40 retracts and pushes the latch rod 56 downward. The spring 566, the top of which is abutted by the upper stop 562, is operable to push the base 582 of sliding arm 58 downward to pivot the latch 54 counterclockwise. When there is no debris in the pocket 522, the spring 566 may be slightly compressed to pivot the latch 54. However, when there is some debris in the pocket 522, the spring 566 may be compressed more to provide sufficient down force to pivot the latch 54 to pass through the debris in the pocket 522. The spring 566 provides compliance in the event that the latch 54 is held up due to the debris interfering the pivotal movement of the latch 54 or even clogged in the pocket 522. In other words, the spring 566 and the sliding arm 58 prevent the down force from the actuator 40 damaging the structure of latch assembly 50. In other implementations, the spring 566 and the sliding arm 58 may be replaced by telescoping features or other sliding features. It is noted that the when the pocket 522 is clogged by the debris, the latch 54 may not pivot to engage the retainer 524. As such, the latch 54 cannot be moved to the engaged position (as shown in FIG. 6A) and the gate 36 may not close completely.

Referring to FIGS. 7A-9, the latch assembly 50 may include a debris shield 60 positioned to at least partially cover the opening of the pocket 522. The debris shield 60 may be positioned between the lower end (i.e., cap end 442) of the actuator 40 and the retainer 524 in a direction parallel to the central longitudinal axis. The debris shield 60 may be positioned between the first portion 526 and the second portion 528 of the latch housing 52, which may be parallel to each other. The debris shield 60 is resiliently deformable to allow the latch 54 to move through the opening of the pocket 522 (FIG. 5) to limit debris entering the pocket 522. The debris shield 60 prevents excessive buildup which prevents the lock assembly 50 (lock mechanism) from fully engaging. The materials of the debris shield 60 may vary, and may include but are not limited to, a brush(es), a flap(s), a foam(s), or other materials that are resiliently deformable. In some implementations, the debris shield 60 may prevent the debris from entering the pocket 522; however, in some implementation, because the pocket 522 can tolerate some smaller debris which can eventually pass through the pocket 522, the debris shield 60 may not completely block all the debris entering the pocket 522.

Figure 7A:
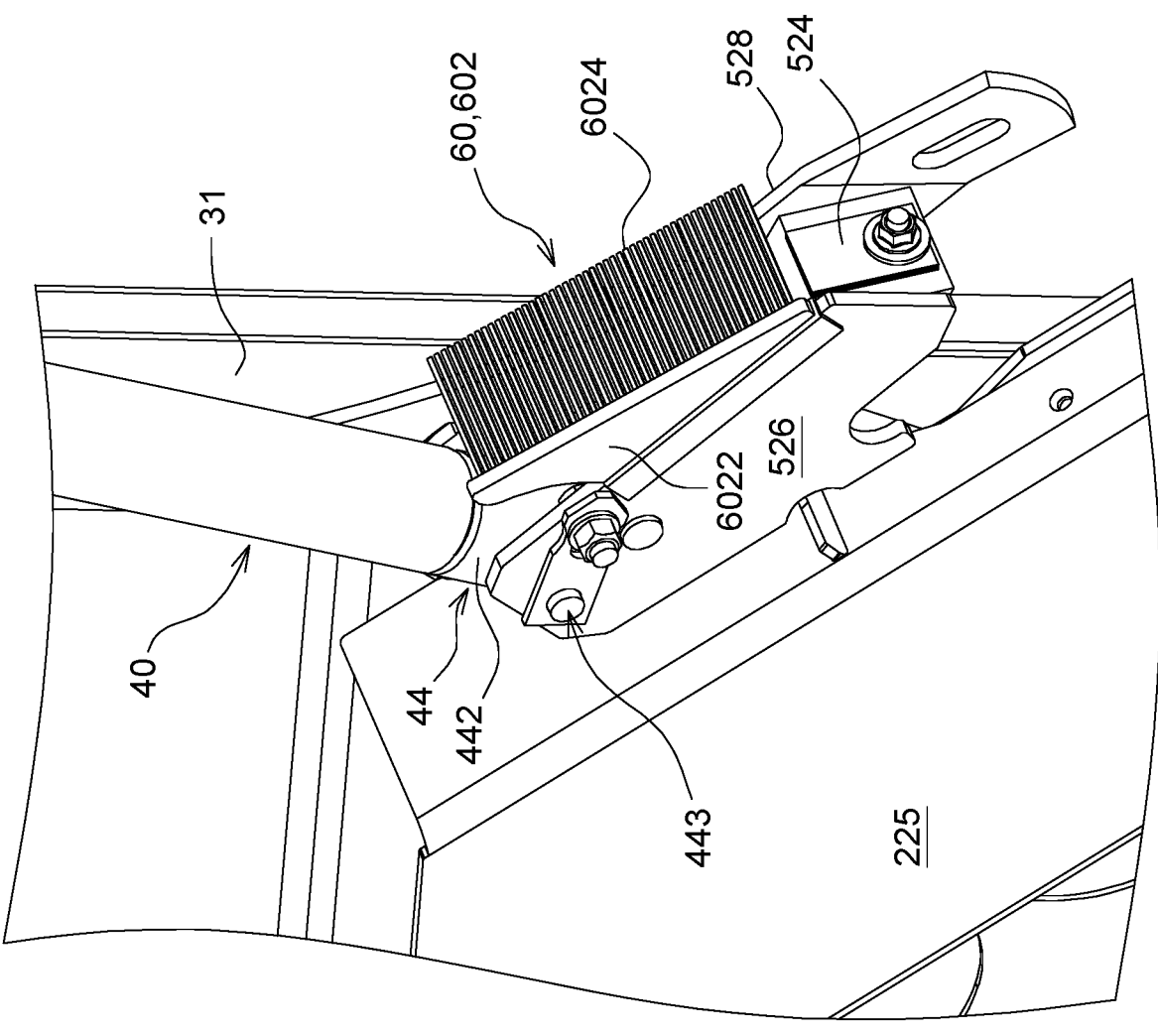
FIG. 7A illustrates an implementation of the debris shield having a first brush at least partially covering an opening of a pocket of the latch housing, with the latch omitted for clarity.
Figure 7B:
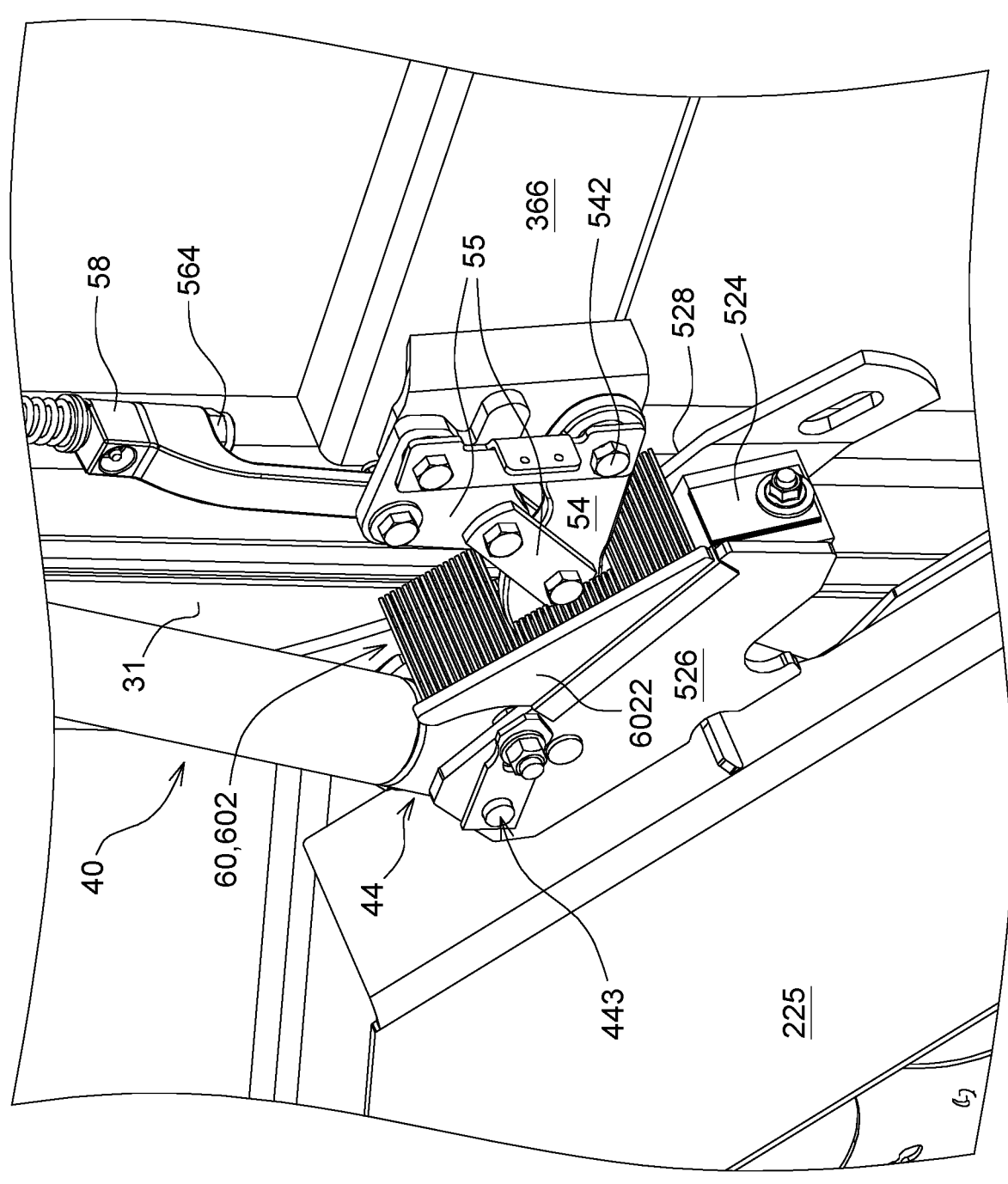
FIG. 7B illustrates the implementation of the debris shield in FIG. 7A, with the latch passing through bristles of the first brush.

The debris shield 60 may include at least one brush positioned across the opening of the pocket 522. As shown in FIG. 7A, the debris shield 60 includes a first brush 602 having a first brush base 6022 couple to the first portion 526 of the latch housing 52 and first bristles 6024 extending from the first brush base 6022 toward the second portion 528 of the latch housing 52. The latch 54 is omitted from FIG. 7A. The first bristles 6024 may extend toward the second portion 528 to reach the second portion 528 or even pass the second portion 528. The first brush base 6022 may be mounted on the top edge of the first portion 526. The front portion of the first brush base 6022 may be higher than the rear portion of the first brush base 6022, and the first bristles 6024, aligned along the top edge of the first brush base 6022, form an inclined surface. When the debris fall on the first brush 602, the debris may roll on the included surface formed by the first bristles 6024 to leave the pocket 522 of the latch housing 52. FIG. 7B illustrates the latch 54 moving through the first bristles 6024 of the first brush 602, which are resiliently deformable materials. The portion of the first bristles 6024 other than those deformed by the latch 54 remain their original positions to at least partially cover the opening of the pocket 522.

Figure 7C:
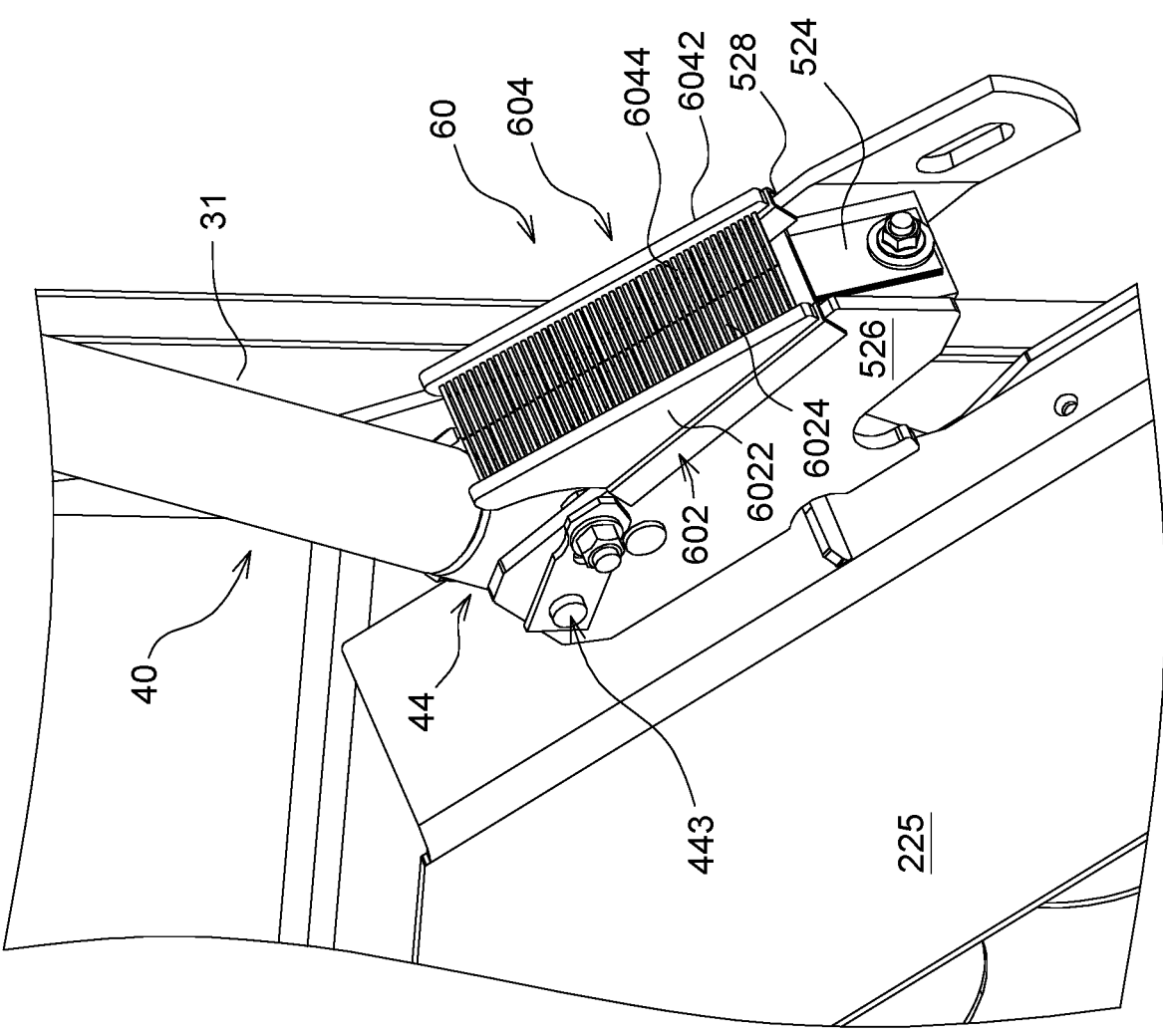
FIG. 7C illustrates an implementation of the debris shield having a first brush and a second brush cooperatively and at least partially covering the opening of the pocket of the latch housing (the first brush may be different from the one shown in FIG. 7A).

Referring to FIG. 7C, in another implementation, the debris shield 60 includes the first brush 602 having the first brush base 6022 couple to the first portion 526 of the latch housing 52 and the first bristles 6024 extending from the first brush base 6022 toward the second portion 528. The debris shield 60 also includes a second brush 604 having a second brush base 6042 coupled to the second portion 528 of the latch housing 52 and second bristles 6044 extending from the second brush base 6042 toward the first portion 526. The second brush base 6042 may be mounted on the top edge of the second portion 528. The front portion of the second brush base 6042 may be higher than the rear portion of the second brush base 6042, and the second bristles 6044, aligned along the top edge of the second brush base 6042, forms half of an inclined surface. The first bristles 6024, in this implementation, may be shorter than the first bristles 6024 in the implementation shown in FIG. 7A and form the other half of the inclined surface. The distal ends of the first bristles 6024 and the distal ends of the second bristles 6044 face each other with small gap along the path of the latch 54 travels. In another implementation (not shown), the first bristles 6024 and the second bristles 6044 may overlap along the direction of their extensions.

It is noted that the structure of first brush base 6022 and/or the second brush base 6042 providing the inclined surface of the first bristles 6024 and/or the second bristles are explanatory. The first brush base 6022 and the second brush base 6042 may be another structure or material, such as glue that attaches the first bristles 6024 to the first portion 526 and/or the second bristles 6044 to the second portion 528.

Figure 7D:
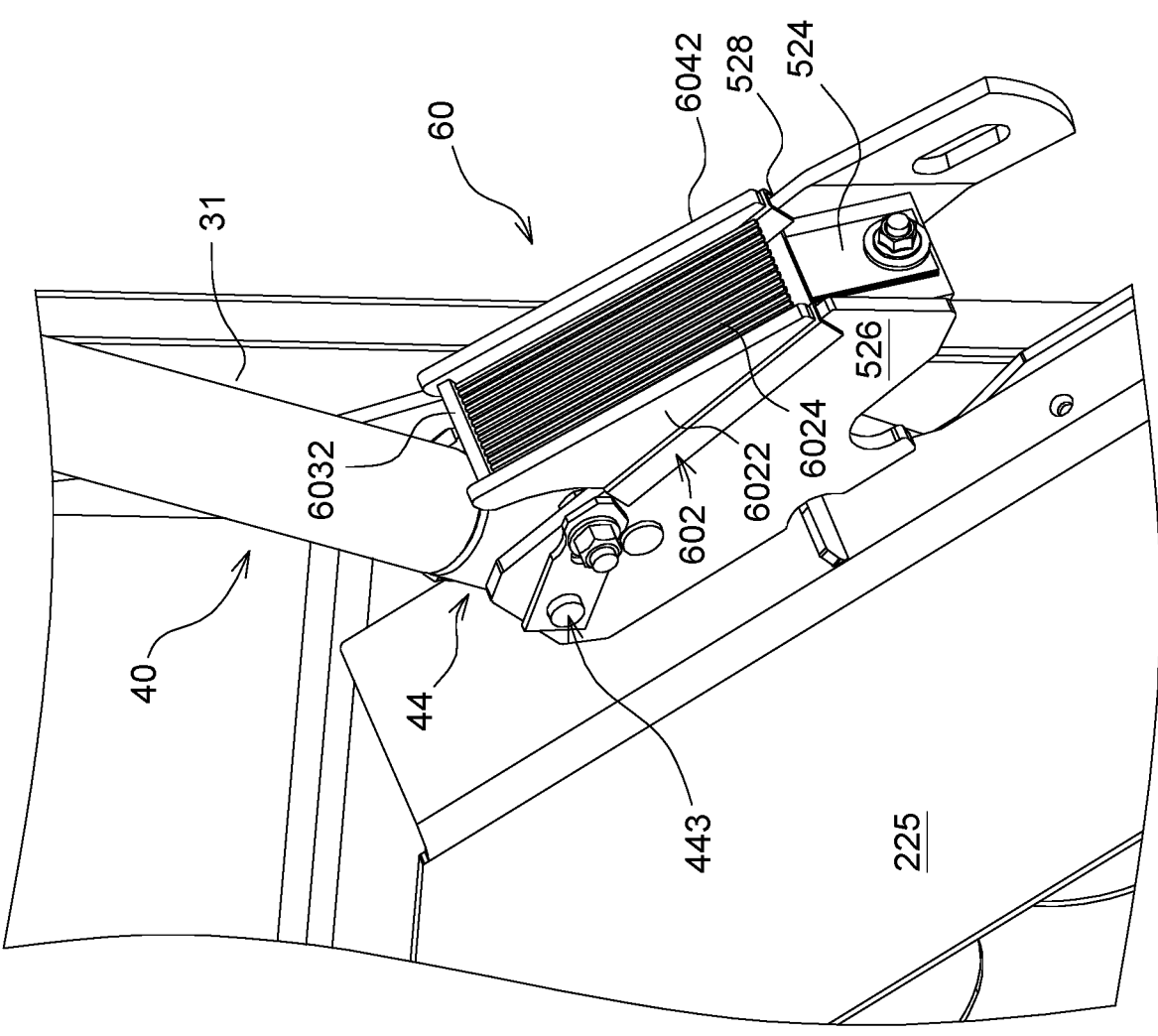
FIG. 7D illustrates an implementation of the debris shield having a first brush extending longitudinally between the first and second portions of the latch housing.

Referring to FIG. 7D, in another implementation, the debris shield 60 includes the first brush 602 having the first brush base 6022 coupled to the first portion 526 of the latch housing 52 and the second brush base 6042 coupled to the second portion 528 of the latch housing 52, a brush base 6032 coupled between the first brush base 6022 and the second brush base 6042 (or between the first portion 526 and the second portion 528), and first bristles 6024 extending from the brush base 6032 toward the retainer 524. The front portion of the first brush base 6022 may be higher than the rear portion of the first brush base 6022, the front portion of the second brush base 6042 may be higher than the rear portion of the second brush base 6042, and the first bristles 6024 extend from the brush base 6032 and go down longitudinally to form an inclined surface. Alternatively, in another implementation (not shown), there is no first brush base 6022 and second brush base 6042, and the brush base 6032 is coupled between the first portion 526 and the second portion 528 of the latch housing 52 with the first bristles 6024 extending toward the retainer 524.

In another implementation, the debris shield 60 may include at least one flexible flap coupled to one of the first portion 526 and the second portion 528 of the latch housing 52 and extending toward the other one of the first portion 526 and the second portion 528 of the latch housing 52. As shown in FIG. 8A, the at least one flexible flap includes a first flexible flap 606 and the second flexible flap 608. The first flexible flap 606 is coupled to the first portion 526 via the first flap base 6062 and extends toward the second portion 528 of the latch housing 52 to form a distal edge 6064. Symmetric to the first flexible flap 606, the second flexible flap 608 is coupled to the second portion 528 of the latch housing 52 via the second flap base 6082 and extends toward the first portion 526 with a distal edge 6084 of the second flexible flap 608 facing the distal edge 6064 of the first flexible flap 606. The latch 54 may be moveable between the distal edge 6064 of the first flexible flap 606 and the distal edge 6084 of the second flexible flap 608 during a transition between the engaged position and the release position. Optionally, the distal edge 6064 of the first flexible flap 606 has a first notch 6065 and the distal edge 6084 of the second flexible flap 608 has a second notch 6085 corresponding to the first notch 6065. The latch 54 is positioned between the first notch 6065 and the second notch 6085 when the latch 54 is in the engaged position (the latch 54 is omitted in FIG. 8A for clarity). In another implementation, as shown in FIG. 8B, the at least one flexible flap may include a single flexible flap 609 coupled to one of the first portion 526 and the second portion 528 of the latch housing 52 and extending to the other one of the first portion 526 and the second portion 528 of the latch housing 52. The flexible flap 609 may include a hole 6095. Like the first notch 6065 and the second notch 6085 shown in FIG. 8A, the hole 6095 may receive the latch 54 when the latch 54 is in the engaged position. The flexible flap 609 may include a slit 6096 connected to the hole 6095. The latch 54 may pass through the hole 6095 and the slit 6096 during the transition between the engaged position and the release position. Here, the hole 6095 and the slit 6096 shown in FIG. 8B are merely example. The hole 6095 has a wider width than the slit 6096. In another implementation, the hole 6095 and the slit 6096 may be replaced by a longer slit (not shown). The material of the flexible flap is deformable for the latch 54 passing through during the transition between the engaged and disengaged positions.

In another implementation, the debris shield includes at least one foam block. The foam block may include and be manufactured from a foam material that is a deformable material. The foam block may be coupled to one of the first portion 526 and the second portion 528 and extend toward the other one of the first portion 526 and the second portion 528. As shown in FIG. 9, the at least one foam block includes a first foam block 610 and a second foam block 612. The first foam block 610 is coupled to the first portion 526 via a first foam base 6102 and extends toward the second portion 528 of the latch housing 52 to form a distal edge 6104. Symmetric to the first foam block 610, the second foam block 612 is coupled to the second portion 528 of the latch housing 52 via a second foam base 6122 and extends toward the first portion 526 with a distal edge 6124 of the second foam block 612 facing the distal edge 6104 of the first foam block 610. The latch 54 may moveable between the distal edge 6104 of the first foam block 610 and the distal edge 6124 of the second foam block 612 during a transition between the engaged position and the release position. Optionally, the first foam block 610 has a ramp 6106 near the distal edge 6104 and the second foam block 612 has a ramp 6126 near the distal edge 6124 corresponding to the ramp 6106. The front and rear portions of the ramps 6106, 6126 have a slope steeper than the slope of the middle portion of the ramps 6106, 6126. The ramps 6106, 6126 form a recess 613, where the latch 54 is positioned when the latch 54 is in the engaged position (the latch 54 is omitted in FIG. 9 for clarity). In another implementation (not shown), the at least one foam block may include a single foam coupled to one of the first portion 526 and the second portion 528 of the latch housing 52 and extending to the other one of the first portion 526 and the second portion 528 of the latch housing 52. The material of the foam is deformable for the latch 54 passing through during the transition between the engaged and disengaged positions. It is noted that the ramps 6106, 6126 are configured to decrease the likelihood of the latch 54 snagged by the first foam block 610 and the second foam block during the transition between the engaged position and the release position. In another implementation, structures such as chamfers and rolled edges may be near the distal edges 6104, 6124. In another implementation, there may be a gap between the distal edges 6104, 6124 that is greater than the thickness of the latch 54 to allow the latch 54 to move smoothly during the transition.

Without in any way limiting the scope, interpretation, or application of the claims appearing below, a technical effect of one or more of the example embodiments disclosed herein is to provide a debris shield positioned to at least partially cover an opening of a pocket of a latch housing without debris clogged therein, so as to allow the latch to engage or release from the retainer. Another technical effect of one or more of the example embodiments disclosed herein is to protect the latch assembly driven by the actuator to lock the gate from damage due to the debris clogged in the latch housing.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A baler implement comprising:
a main frame extending along a central longitudinal axis between a forward end and a rearward end relative to a direction of travel;
a main housing attached to and supported by the main frame;
a gate positioned adjacent the rearward end of the main frame and attached to and rotatably supported by the main housing, wherein the gate is pivotably moveable about a gate axis that is perpendicular to the central longitudinal axis of the main frame;
a latch housing coupled to one of the main frame or the gate, the latch housing having a retainer and defining a pocket having an opening;
a latch coupled to an other one of the main frame or the gate for engaging the retainer of the latch housing, wherein the latch is controllable between a release position operable to disengage the retainer to allow the gate to move relative to the main housing and an engaged position operable to engage the retainer to hold the gate relative to the main housing; and
a debris shield positioned to at least partially cover the opening, wherein the debris shield is resiliently deformable to allow the latch to move through the opening of the pocket, the debris shield to limit debris entering the pocket, the debris shield including a brush positioned across at least a portion of the opening of the pocket.

2. The baler implement of claim 1, wherein the brush is a first brush having a first brush base coupled to a first portion of the latch housing and first bristles extending from the first brush base toward a second portion of the latch housing, and wherein the debris shield further includes a second brush having a second brush base coupled to the second portion of the latch housing and second bristles extending from the second brush base toward the first portion.

3. A baler implement comprising:
a main frame extending along a central longitudinal axis between a forward end and a rearward end relative to a direction of travel;
a main housing attached to and supported by the main frame;
a gate positioned adjacent the rearward end of the main frame and attached to and rotatably supported by the main housing, wherein the gate is pivotably moveable about a gate axis that is perpendicular to the central longitudinal axis of the main frame;

a latch housing coupled to one of the main frame or the gate, the latch housing having a retainer and defining a pocket having an opening;

a latch coupled to an other one of the main frame or the gate for engaging the retainer of the latch housing, wherein the latch is controllable between a release position operable to disengage the retainer to allow the gate to move relative to the main housing and an engaged position operable to engage the retainer to hold the gate relative to the main housing; and a debris shield positioned to at least partially cover the opening, wherein the debris shield is resiliently deformable to allow the latch to move through the opening of the pocket, the debris shield to limit debris entering the pocket, the debris shield including a first flexible flap coupled to one of a first portion of the latch housing or a second portion of the latch housing and extending toward an other one of the first portion of the latch housing or the second portion of the latch housing.

4. The baler implement of claim 3, wherein the first flexible flap extends toward the other one of the first portion of the latch housing or the second portion of the latch housing to form a distal edge having a notch to receive the latch when the latch is in the engaged position.

5. The baler implement of claim 3, wherein the first flexible flap is coupled to the first portion of the latch housing and extends toward the second portion of the latch housing, the debris shield includes a second flexible flap coupled to the second portion of the latch housing and extending toward the first portion of the latch housing with a second distal edge of the second flexible flap facing a first distal edge of the first flexible flap, and the latch is moveable between the first distal edge of the first flexible flap and the second distal edge of the second flexible flap during a transition between the engaged position and the release position.

6. The baler implement of claim 5, wherein the first distal edge of the first flexible flap has a first notch, the second distal edge of the second flexible flap has a second notch corresponding to the first notch, and the latch is positioned between the first notch and the second notch when the latch is in the engaged position.

7. The baler implement of claim 1, further including an actuator coupled to the gate and operable to pivot the gate upward to open the gate and to pivot the gate downward to close the gate, wherein the actuator includes a lower end positioned between and supported by a first portion of the latch housing and a second portion of the latch housing.

8. The baler implement of claim 7, wherein the debris shield is positioned between the lower end of the actuator and the retainer in a direction parallel to the central longitudinal axis.

9. The baler implement of claim 7, further including a latch rod having a first end coupled to an upper end of the actuator and a second end coupled to the latch so as to lock or unlock the latch with the actuator retracting or extending.

10. The baler implement of claim 1, wherein the latch housing includes a first portion and a second portion, the first portion includes a first plate and the second portion includes a second plate parallel to the first plate with a pin coupled therebetween.

11. A baler implement comprising:

a main frame extending along a central longitudinal axis between a forward end and a rearward end relative to a direction of travel;

a main housing attached to and supported by the main frame;

a gate positioned adjacent the rearward end of the main frame and attached to and rotatably supported by the main housing, wherein the gate is pivotably moveable about a gate axis that is perpendicular to the central longitudinal axis of the main frame;

a latch housing coupled to one of the main frame or the gate, the latch housing having a retainer and defining a pocket having an opening;

a latch coupled to an other one of the main frame or the gate for engaging the retainer of the latch housing, wherein the latch is controllable between a release position operable to disengage the retainer to allow the gate to move relative to the main housing and an engaged position operable to engage the retainer to hold the gate relative to the main housing; and a debris shield positioned to at least partially cover the opening, wherein the debris shield is resiliently deformable to allow the latch to move through the opening of the pocket, the debris shield to limit debris entering the pocket, the debris shield including a foam block coupled to one of a first portion of the latch housing or a second portion of the latch housing and extending toward an other one of the first portion of the latch housing or the second portion of the latch housing.

12. The baler implement of claim 1, wherein the latch housing is attached to the main frame.

13. A latch assembly coupled to a main frame of a baler implement to selectively hold a gate relative to a main housing of the baler implement, the latch assembly comprising:

a latch housing coupled to one of the main frame or the gate, the latch housing having a retainer and defining a pocket having an opening;

a latch coupled to an other one of the main frame or the gate for engaging the retainer of the latch housing, wherein the latch is controllable between a release position operable to disengage the retainer to allow the gate to move relative to the main housing and an engaged position operable to engage the retainer to hold the gate relative to the main housing; and a debris shield positioned to at least partially cover the opening, wherein the debris shield is resiliently deformable to allow the latch to move through the opening of the pocket, the debris shield to limit debris entering the pocket, the debris shield including a brush positioned across at least a portion of the opening of the pocket.

14. The latch assembly of claim 13, wherein the brush is a first brush having a first brush base coupled to a first portion of the latch housing and first bristles extending from the first brush base toward a second portion of the latch housing, and the debris shield further includes a second brush having a second brush base coupled to the second portion of the latch housing and second bristles extending from the second brush base toward the first portion.

15. A latch assembly coupled to a main frame of a baler implement to selectively hold a gate relative to a main housing of the baler implement, the latch assembly comprising:

a latch housing coupled to one of the main frame or the gate, the latch housing having a retainer and defining a pocket having an opening;

a latch coupled to an other one of the main frame or the gate for engaging the retainer of the latch housing, wherein the latch is controllable between a release position operable to disengage the retainer to allow the gate to move relative to the main housing and an engaged position operable to engage the retainer to hold the gate relative to the main housing; and a debris shield positioned to at least partially cover the opening, wherein the debris shield is resiliently deformable to allow the latch to move through the opening of the pocket, the debris shield to limit debris entering the pocket, the debris shield including a first flexible flap coupled to one of a first portion of the latch housing or a second portion of the latch housing and extending toward an other one of the first portion of the latch housing or the second portion of the latch housing.

16. A latch assembly coupled to a main frame of a baler implement to selectively hold a gate relative to a main housing of the baler implement, the latch assembly comprising:

a latch housing coupled to one of the main frame or the gate, the latch housing having a retainer and defining a pocket having an opening;

a latch coupled to an other one of the main frame or the gate for engaging the retainer of the latch housing, wherein the latch is controllable between a release position operable to disengage the retainer to allow the gate to move relative to the main housing and an engaged position operable to engage the retainer to hold the gate relative to the main housing; and a debris shield positioned to at least partially cover the opening, wherein the debris shield is resiliently deformable to allow the latch to move through the opening of the pocket, the debris shield to limit debris entering the pocket, the debris shield including a foam block coupled to one of a first portion of the latch housing or a second portion of the latch housing and extending toward an other one of the first portion or the second portion.

* * * * *